US012384192B2

(12) United States Patent
Wagner et al.

(10) Patent No.: US 12,384,192 B2
(45) Date of Patent: Aug. 12, 2025

(54) FILLING SYSTEM FOR A FOUNTAIN PEN

(71) Applicant: Montblanc-Simplo GmbH, Hamburg (DE)

(72) Inventors: Thilo Wagner, Hamburg (DE); Jörg Dickopp, Hamburg (DE)

(73) Assignee: Montblanc-Simplo GmbH (DE)

( * ) Notice: Subject to any disclaimer, the term of this patent is extended or adjusted under 35 U.S.C. 154(b) by 45 days.

(21) Appl. No.: 18/043,362

(22) PCT Filed: Sep. 1, 2021

(86) PCT No.: PCT/EP2021/074137

§ 371 (c)(1),
(2) Date: Feb. 28, 2023

(87) PCT Pub. No.: WO2022/049127

PCT Pub. Date: Mar. 10, 2022

(65) Prior Publication Data

US 2024/0025202 A1 Jan. 25, 2024

(30) Foreign Application Priority Data

Sep. 2, 2020 (DE) ......................... 102020122967.4

(51) Int. Cl.
*B43K 11/00* (2006.01)
*B43K 5/18* (2006.01)

(52) U.S. Cl.
CPC .............. *B43K 11/00* (2013.01); *B43K 5/189* (2013.01)

(58) Field of Classification Search
CPC ................................ B43K 11/00; B43K 5/189
See application file for complete search history.

(56) References Cited

U.S. PATENT DOCUMENTS

| | | | | |
|---|---|---|---|---|
| 2,894,541 | A | 7/1959 | Gutierrez | |
| 5,518,331 | A * | 5/1996 | Moosmann | B43K 5/08 401/230 |
| 2013/0058703 | A1 | 3/2013 | Tomohiro | |

FOREIGN PATENT DOCUMENTS

| | | | |
|---|---|---|---|
| CH | 255993 | A | 7/1948 |
| CN | 1532073 | A | 9/2004 |
| CN | 2719595 | Y | 8/2005 |
| CN | 1925992 | A | 3/2007 |
| CN | 101321635 | A | 12/2008 |
| CN | 102131652 | A | 7/2011 |
| CN | 108501571 | A | 9/2018 |
| DE | 4409756 | A1 | 9/1995 |
| DE | 102011009554 | A1 | 7/2012 |
| DE | 202015102174 | U1 | 4/2015 |

(Continued)

*Primary Examiner* — Timothy L Maust
(74) *Attorney, Agent, or Firm* — Ingrassia Fisher & Lorenz, LLP

(57) ABSTRACT

A filling system for a fountain pen includes a pump unit, an air channel connected to the pump unit and to a first connection for connecting to the fountain pen, and an ink channel separate from the air channel and having an immersion end for immersing in ink and which is connected to a second connection for connecting to the fountain pen. The pump unit is designed to introduce a specified air volume into the air channel with positive pressure in order to flush ink out of the fountain pen and subsequently apply a negative pressure to the air channel such that a specified ink volume is suctioned out of the ink channel into the fountain pen.

15 Claims, 3 Drawing Sheets

(56) References Cited

FOREIGN PATENT DOCUMENTS

| | | | | | |
|---|---|---|---|---|---|
| GB | 238110 | A | | 8/1925 | |
| GB | 514513 | A | | 11/1939 | |
| JP | 2010099927 | A | | 5/2010 | |
| JP | 2010149379 | A | | 7/2010 | |
| JP | 2011161670 | A | | 8/2011 | |
| JP | 2018024192 | A | | 2/2018 | |
| JP | 2018140527 | A | | 9/2018 | |
| WO | WO-2005084961 | A1 | * | 9/2005 | ............. B43K 11/00 |

* cited by examiner

FILLING SYSTEM FOR A FOUNTAIN PEN

CROSS-REFERENCE TO RELATED APPLICATIONS

This application is a National Stage of International Application No. PCT/EP2021/074137, filed Sep. 1, 2021, which claims the benefit and priority of DE 10 2020 122 967.4, filed Sep. 2, 2020. The entire disclosures of each of the above applications are incorporated by reference herein.

TECHNICAL FIELD

The invention relates to a filling system for a fountain pen, a writing instrument system with a filling system and a fountain pen as well as a method for filling a fountain pen.

BACKGROUND

Fountain pens having an integrated ink tank comprising a piston are known, which pens are filled by immersion of a writing point in an ink container and by the sucking in of ink by means of the motion of the piston. The immersion of the writing point causes it to be wetted with ink, such that the filling process always leads to a fouling of the writing point with ink. The writing point must therefore always be cleaned.

Occasionally, it is also expedient, in particular in the case of high-quality fountain pens, to clean ink-conducting channels in order to ensure a continuous operation without issues. This can be accomplished, for example, through rinsing of the fountain pens with a liquid, for example distilled water.

SUMMARY

A task of the invention is to provide an alternative filling system for a fountain pen, which allows for a filling of a fountain pen that is as convenient and clean as possible without fouling the writing point.

This task is solved by a filling system for a fountain pen having the features of the independent claim 1. Advantageous embodiments and further developments are to be found in the sub-claims and the following description.

A filling system for a fountain pen is provided, comprising a pump unit, an air channel which is connected to the pump unit and to a first connection for connecting to the fountain pen, and an ink channel which is separated from the air channel and comprising an immersion end for immersing in ink, which ink channel is connected to a second connection for connecting to the fountain pen, wherein the pump unit is configured to introduce a predetermined air volume of air at a positive pressure into the air channel in order to flush out ink from the fountain pen, and to subsequently apply a negative pressure to the air channel such that a predetermined volume of ink is suctioned out of the ink channel into the fountain pen.

In the sense of the invention, the pump unit is to be understood as a device, which is configured to convey a fluid. As explained above, this can, in particular, be air. It is expedient to configure the pump unit in such a way that it can be placed on an ink container. The pump unit could therefore be implemented in the form of an ink container attachment. Other implementations are, however, also conceivable, implementations that can be integrated directly in an ink container or a closure thereof. In other variants, the pump unit could be connectable only to an ink container and implemented separately therefrom. An ink container could, for example, be an inkwell, which is commonly used for filling of fountain pens. It could be made of glass and comprise an opening that can be closed with a screw cap. By way of example, the pump unit could be adapted to be placed on such an inkwell with the lid unscrewed. In so doing, it could be screwed to an external thread of the ink container, such that it is securely attached to the ink container for the duration of the filling. Alternatively, it is also conceivable that an ink container is directly equipped with the pump unit, which would then be permanently attached to the ink container and, if necessary, be closable with a lid. The pump unit could be pressed or snapped into the ink jar opening.

It is assumed here that the fountain pen is connected to the air channel in such a way that a first end or a first section of an ink tank located in the fountain pen comes into fluid connection with the first connection. A second end or a second section of the ink tank that is opposite the first end can be in fluid connection with the ink channel. If air having a positive pressure is introduced in the air channel, ink in the ink tank of the fountain pen is flushed out as a consequence and passes through the ink channel to an ink container connected to the pump unit. Following the introduction of the air volume, the ink tank is preferably completely emptied. By the subsequent application of a negative pressure to the air channel, air is consequently suctioned back into the pump unit via the air channel. Ink out of the ink channel is hereby suctioned into the ink tank through the connection with the ink tank of the fountain pen. Ink flows through the ink channel into the ink tank and is thereby filled. For this purpose, the ink channel comprises an immersion end, which is intended for immersion in ink.

It is advisable to implement the connections to the fountain pen as simply as possible. It may be advisable, for example, to implement them as small tubes or tube ends, onto which only corresponding connections of the fountain pen must be plugged for connection. Consequently, it is sufficient to plug the fountain pen onto the connections, for example, after opening a closure or a housing part, and to pull connections off again in the opposite direction after the filling process.

In so doing, it is preferable to adapt the air volume as well as the ink volume to the filling volume of the ink tank such that a complete filling of the ink tank can be achieved. As a consequence, the filling system is a very convenient and neat way of refilling an ink tank of a fountain pen adapted for use with the filling system without needing to immerse the writing point in an ink container.

The pump unit can be implemented mechanically or electrically. A mechanical implementation could, for example, comprise a piston that is moved for pumping. An electrical implementation could, for example, be configured in the form of an electrical dosing pump.

In a particularly advantageous embodiment, the pump unit comprises a cylinder with a lower section and an opening laid out opposite the lower section, an axially movable piston in the cylinder, and a spring element driving the piston in the direction of the opening, wherein the air channel extends through the piston from an air chamber formed between the piston and the lower section, wherein the ink channel extends through the lower section and the piston, wherein the piston is radially sealed from the cylinder such that a positive pressure acting on the first connection is created by a pressing of the piston in the direction of the lower section and a negative pressure acting on the first connection is created when the piston is released.

Air is fed into the air channel by moving the piston within the cylinder. This can occur, for example, by pressing the piston in the direction of the lower section such that the air chamber is reduced there. The spring element is provided to move the piston back in the other direction. The release of the piston can as a consequence lead to an increase in the volume of the air chamber such that a negative pressure is created. This leads to air being sucked back into the air chamber via the air channel. Ink resulting from the ink channel flows back into the ink channel through the fluid connection with the ink channel provided in the fountain pen. The ink tank is filled thereby. It is thereby preferable to adapt the stroke of the piston and the difference in volume of the air chamber to the filling volume of the ink tank such that the complete filling of the ink tank is achieved.

The cylinder of the pump unit could comprise at least one cylindrical bore which extends from the opening to the lower section. The lower section is thereby to be understood as a lower termination of the cylinder facing away from the opening. In a simple case, the lower section can comprise nothing more than a flat surface. In another case, it is possible that one or a plurality of shoulders is provided, which reduces the interior diameter of the cylinder, at least in certain areas.

The piston has an external diameter that is adapted to the interior diameter of the cylinder. To enable a smooth slide of the piston in the cylinder, it is possible to provide a corresponding sliding fit for the piston and cylinder. An interior wall of the cylinder can further have a lubricious coating.

The spring element is configured to permanently exert a force on the piston such that it is impelled in a direction away from the lower section. This can, for example, be a compression spring which is arranged between the lower section and the piston. On the other hand, it could also be a tension spring or some other device that is arranged in an area of the cylinder facing away from the lower section and which pulls the piston back in the direction of the opening. The material of the spring element can be metallic, comprise plastics or a material of natural origin, by way of example, rubber. A compression spring could, in particular be made of a metallic material or of plastics. A tension spring could, moreover, be made of rubber in the form of one or a multitude of tensile elements. The spring element enables the positioning of the piston in a neutral position, in which a user can connect a fountain pen to the mentioned connections, for example, by pushing it on. The user can subsequently push the piston in towards the lower section by pressing the fountain pen such that the function of the filling system is initiated, and by releasing the fountain pen, the piston returns once again to its neutral position by the compression spring. Both channels are essential for functionality.

The air channel could extend from the first connection through the piston into the air chamber. By moving the piston in the direction of the lower section, a positive pressure is created in the air chamber due to the radial seal between the piston and the cylinder. Since the air channel opens into the air chamber, the positive pressure passes through the air channel into the first connection. It is provided that a fountain pen can be connected to the air channel and for this purpose has, for example, a small tube or other line which extends into an ink tank of the fountain pen.

The ink channel could extend beyond the lower section. By way of example, if the pump unit is arranged on an ink tank, the ink channel can extend into the tank, for example into the ink volume found there. The ink channel can be connected to a second line of the fountain pen. This second line can preferably be in fluid connection with the first line, for example, through an ink tank arranged in the fountain pen. Both connections could be connectable to opposite ends of the ink tank for this purpose.

The immersion end is to be provided such that it can extend into ink of an ink container. By way of example, it could extend or protrude from the piston through the lower section. Other variants could also be considered in which the immersion end does not extend through the lower section, but rather is guided in a different manner. For this purpose, it may be appropriate to use a flexible connecting line, one end of which runs with the piston and the opposite end of which is at least largely fixed.

To prevent the occurrence of positive pressure in the ink container, a vent opening could be provided between the ink container and the pump unit, for example, in the form of one or a plurality of openings. These could be implemented as a slot or as a bore, for example, in a shoulder with which the pump unit rests on the ink container.

In a preferred embodiment, the spring element is a compression spring and is arranged between the lower section and the piston. In so doing, the lower section can have an indentation or recess into which one end of the compression spring can be inserted. The piston may likewise have a recess, groove or other indentation that could receive the opposite end of the compression spring. The compression spring is particularly preferably a helical or conical spring that can move the piston away from the lower section. An unintentional pushing out of the piston is essentially achieved by a form fit. The ends of the compression spring may be exposed and, for example, be centered by a positioning in recesses or other geometric features. It would, however, also be possible to secure the spring element with its two ends facing one another so that a pulling out or popping out of the piston from the cylinder is not possible. For example, the compression spring can be bonded on both sides. Preferably, its spring constant is adjusted so that a user can easily push the piston in and thereby the compression spring does not offer excessive resistance. Similarly, the compression spring should likewise be firm enough to allow a user to easily insert the fountain pen onto the connectors without the piston already moving.

In an advantageous embodiment, the piston comprises a first sealing member arranged on a side facing the lower section. The first sealing member can, for example, be configured in a ring shape and surround part of the piston. It can, for example, be connected to the piston in a form-fitting manner. Bonding or other connection means could however also be possible. The first sealing member may have outer radial projections that come into surface contact with an interior wall of the cylinder. Instead of one or a plurality of projections, it is also possible that the entire first sealing member can be in flush contact with the interior wall of the cylinder. In this manner, it is assuredly prevented that air from the air chamber escapes from the filling system via the piston. The sealing member could be made of natural or synthetic rubber or a similar rubber-like material.

In an advantageous embodiment, the immersion end is guided in an axially sliding manner through a second sealing member arranged in the lower section. This allows a sealing of the air chamber in the area of the lower section without having to dispense with a fluid connection with an ink volume and with the ink channel. In a simple case, the second sealing member can be a sealing ring that has an angular, round or X-shaped profile cross section. Other profile cross sections are conceivable.

Moreover, beyond a neutral position of the piston, a sealing section of the immersion end can be seated in the second sealing member, wherein the immersion end comprises an overflow section which is arranged adjacent to the sealing section in the direction of the piston and comprises, at least in certain areas, a taper for passing ink from the air chamber through the lower section. The overflow section is located in the neutral position within the second sealing member and consequently no seal to the immersion end can be created when the piston is in its neutral position. In this position, it is pushed towards the opening by the spring element. Ink that is in the air chamber can then flow from the lower section via the overflow section into the ink container. This could be necessary, for example, if too much ink is suctioned out of the ink container during filling of the fountain pen due to the piston stroke, so that the ink partially passes entirely through the ink tank and ends up in the air line. As a consequence, it then ends up in the air chamber and can flow out from there. If the piston is pushed in the direction of the lower section, the sealing section can end up overlapping the second sealing member and the air chamber is once again sealed off to generate the required positive pressure for the filling process.

To ensure that the ink tank is always completely filled, the volume of the air chamber could be larger than the volume of the ink tank to be filled.

In a particularly preferable manner, the first connection and the second connection can be configured concentrically to one another. In this way, a user cannot incorrectly attach the fountain pen on the first and second connections, since each rotational position is suitable for making the connection.

The first connection could, moreover, be arranged within the second connection and extend beyond the second connection. This could facilitate placement of the fountain pen and achieve sufficient segregation of the two connections.

In an advantageous embodiment, the first connection and the second connection are arranged in an insertion sleeve that is arranged on a side of the piston facing away from the air chamber. The insertion sleeve could protrude from or be formed in an upper side of the piston. The upper side is to thereby be considered as the side of the cylinder opposite the lower section. The insertion sleeve allows an easy, intuitive insertion of a fountain pen into the filling system.

At least one third sealing member could be arranged between the insertion sleeve and the piston. The third sealing member allows the sealing of corresponding lines of the fountain pen to the two connections. The third sealing member can, however, also be a part of the fountain pen.

It is moreover advantageous if a first section of the immersion end, which is arranged on a side of the lower section facing away from the air chamber, has a larger outer diameter than a second section which is arranged in the air chamber in a neutral position of the piston. Due to the larger outer diameter, a shoulder can be formed which can, for example, nestle against the lower section from below, which is to say, from a side facing away from the air chamber. An additional body, for example, a sealing member or a spacer, can, however, also be located between the lower section and the first section of the immersion end. Both the inadvertent extraction of the piston and a flush closure of the piston with the opening are made possible if the piston and the immersion end are correspondingly dimensioned and adapted to one another.

In one embodiment, the air channel and the ink channel could be arranged in the piston, radially offset from one another in the piston, at least in certain areas. The guidance of air and ink within the piston can thereby be somewhat simplified.

It is advantageous if the cylinder has a shoulder on its outer side for flush placement of the cylinder on an opening rim of an ink container. In particular in the case of high-quality ink containers, a harmonious unit can be achieved between the cylinder and the ink container. It is conceivable that the cylinder is adapted to be attached directly to the ink container with a screw ring. The filling system and the ink container would then be one coherent unit. An additional lid could then be screwable onto the opening.

The invention further relates to a writing instrument system comprising a filling system according to the description here above and a fountain pen, wherein the fountain pen comprises a coupling arrangement and an ink tank with a first section and a second section, wherein the coupling arrangement is connected to the first section and the second section and is connectable to the first connection and the second connection such that a fluid connection can be established between the first connection and the first section and between the second connection and the second section.

The invention further relates to a method for filling a fountain pen, comprising the steps of connecting a first connection of a pump unit to a first section of at least one ink tank in the fountain pen, of connecting a second connection of the pump unit to a second section of the at least one ink tank in the fountain pen, and of immersing the second connection into ink of an ink container, of introducing air with a positive pressure into the first connection to flush out the remnants of ink found in the at least one ink tank via the second connection into the ink container, and of generating a negative pressure at the first connection for drawing ink into the at least one ink tank via the second connection.

As explained above, a complete filling of an ink tank in a fountain pen can hereby be achieved. The positive pressure causes a residual amount of ink to be conveyed out of the ink tank via the second connection. The subsequent application of a negative pressure, however, leads to ink being suctioned into the ink tank via the second connection. For this purpose, the first connection can be connected to a pump unit that is configured to provide air at a positive pressure and then at a negative pressure. If the first section and the second section are located at opposite ends of the ink tank, the entire volume of the ink tank located in between can be filled with ink. It is further conceivable that the at least one ink tank also comprises more than only one ink tank, which are connectable to one another. The first section and the second section may be arranged at opposite ends of the entire arrangement of ink tanks, such that the entire arrangement of ink tanks is filled with ink by said method.

Similarly to the foregoing embodiments, the introduction of air and the creation of a negative pressure may occur by means of a pump unit that comprises a cylinder with an axially movable, spring-loaded piston disposed therein, the piston being pressed by a user to introduce air and released to create the negative pressure.

BRIEF DESCRIPTION OF THE FIGURES

Further features, advantages and possible applications of the present invention will be apparent from the following description of the embodiment examples and the figures. In this, all described and/or illustrated features on their own or in any combination form the object of the invention, including independently of their composition in the individual claims or their references. Furthermore, in the figures the same reference numbers refer to the same or similar objects.

DETAILED DESCRIPTION

Figure 1:
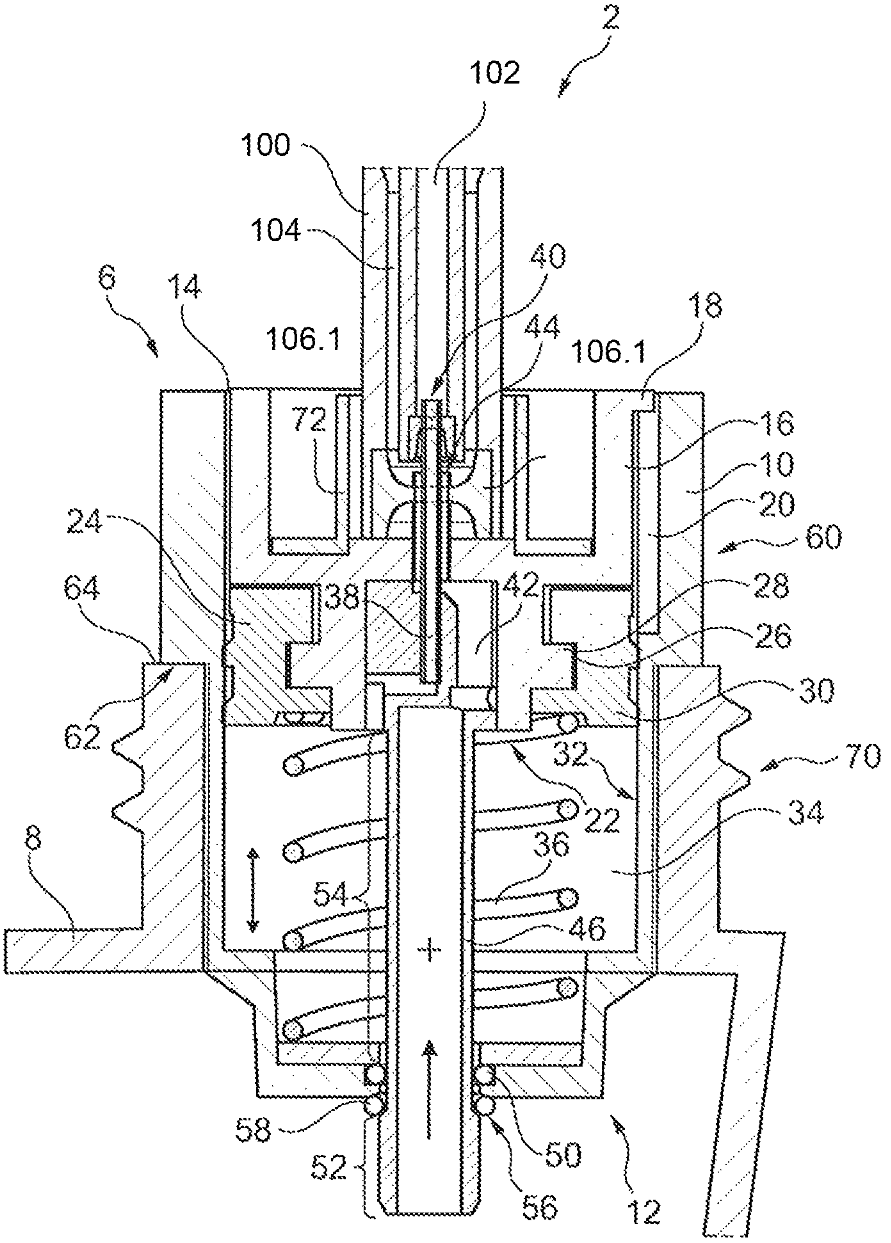
FIG. 1 shows a filling system in a cross-sectional view.

FIG. 1 shows a filling system 2 for a fountain pen 100. The filling system 2 has a pump unit 6 that can be placed on an ink container 8. The pump unit 6 has a cylinder 10, which has a lower section 12 and an opening 14 opposite the lower section 12.

There is an axially movable piston 16 arranged in the cylinder 10. This piston, by way of example, comprises a radial projection 18 which can slide in a groove 20 of the cylinder 10. In this manner, an anti-rotation protection of the cylinder 16 is achieved.

A first sealing member 24 is arranged on a bottom side 22 of the piston 16.

This first sealing member 24 is connected in a form-fitting manner to the piston 16. For this purpose, the first sealing member 24 has a circumferential radial groove 26 into which a circumferential radial projection 28 of the piston 16 extends. The first sealing member 24 has two annular and spaced-apart, radially circumferential sealing lips 30 that bring about a surface contact with an interior wall 32 of the cylinder 10. This forms an air chamber 34 between the lower section 12 and the bottom side of the piston 16, in which air chamber air is pressurized by moving the piston 16.

The piston 16 is in a neutral position in FIG. 1, in which position the piston 16 is substantially flush with the opening 14 of the cylinder 10. A compression spring 36 is located between the lower section 12 and the piston 16, which spring 36 always forces the piston 16 back into the neutral position. By way of example, it is configured as a helical spring.

An air channel 38 extends from the air chamber 34 through the piston all the way to a first connection 40. This air channel 38 may be in the form of a small tube. An ink channel 42 separated from the air channel 38 extends through the lower section 12 and the piston 16 all the way to a second connection 44. The second connection 44 is preferably configured concentrically to the first connection 40, wherein the openings of both connections 40, 44 are spaced apart. The opening of the first connection 40 projects beyond the opening of the second connection 44. This can, however, also be the other way around.

The ink channel 42 has an immersion end 46 that projects from the piston 16. The immersion end 46 is provided to protrude into the ink container 8, in which container an ink volume is located. When the piston 16 is pressed by a user in the direction of the lower section 12, the volume of the air chamber 34 decreases. In order to equalize the air pressure, air can flow into the air channel 38 and there can be directed all the way to the first connection 40. An air line 102 of the fountain pen 100 is provided there, which is here brought into fluid connection with the air channel 38, such that air from the air channel 38 flows into it.

An ink tank of the fountain pen 100, which is not shown here (see FIG. 3*b*), is connected to the air line 102 and is also in fluid connection with an ink line 104. Residual ink from the ink tank of the fountain pen 100 is directed via this ink line 104 into the second connection 44 and thereby into the ink channel 42. It then flows in the ink container 8. Upon release of the piston 16, a negative pressure is created at the air channel 38 due to the push back of the piston 16 into the neutral position, such that ink is suctioned into the ink tank of the fountain pen 100 through the fluid connection with the ink line 104 and the ink channel 42. As a consequence, the fountain pen 100 can be filled by simply attaching it to the filling system 2, pressing it in and releasing the piston 16.

The immersion end 46 is guided in an axially sliding manner by a second sealing member 50 integrated in the lower section 12. This makes it possible to achieve a sealing of the air chamber 34 from the ink container 8. The first section 52 of the immersion end 46 comprises a larger outer diameter than a second section 54, which section is arranged on a side of the immersion end 46 facing the piston 16. This forms a type of shoulder 56 by means of which the immersion end 46 can nestle flush against the second sealing member 50 or an additional stop 58.

The cylinder 10 has a shoulder 62 on an outer side 60 for flush placement of the cylinder 10 on an opening rim 64 of the ink container 8. A part of the cylinder 10 projecting into the ink container 8 has an outer diameter that is adapted to an inner diameter of the ink container 8 so that the cylinder 10 is seated in the ink container 8 with as little play as possible.

By way of example, the fountain pen 100 comprises two third sealing members 106.1, 106.2 through which the first connection 40 and the second connection 44 extend when the fountain pen 100 is attached to the filling system 2. These sealing members 106.1, 106.2 can also be part of the filling system 2.

Figure 2:
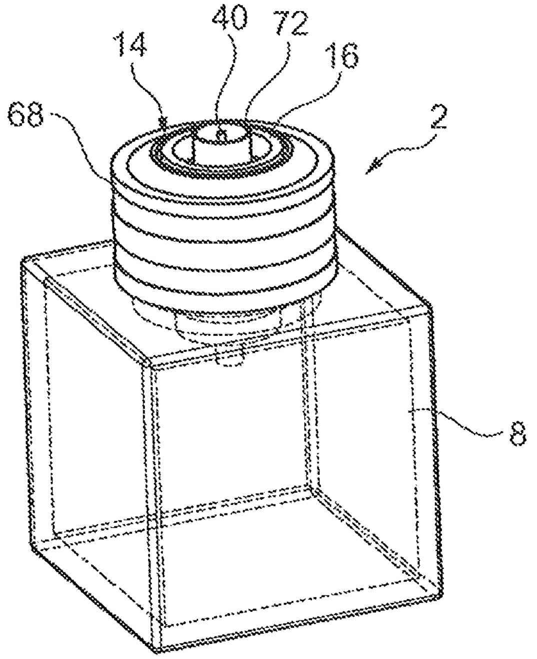
FIG. 2 and FIG. 3*a* show an ink container with a filling system without an attached fountain pen (FIG. 2) and with an attached fountain pen (FIG. 3*a*).

FIG. 2 shows the filling system 2 on the ink container 8. Here, a screw ring 68 is provided to fasten the filling system 2 to the ink container 8. For this purpose, the ink container 8 has a thread 70 (see also FIG. 1). To simplify the guiding of the fountain pen 100 onto the filling system 2, it has an insertion sleeve 72 that projects over the opening 14. When the fountain pen 100 is inserted, a connection can be made with the connections 40 and 44.

Figure 3A:
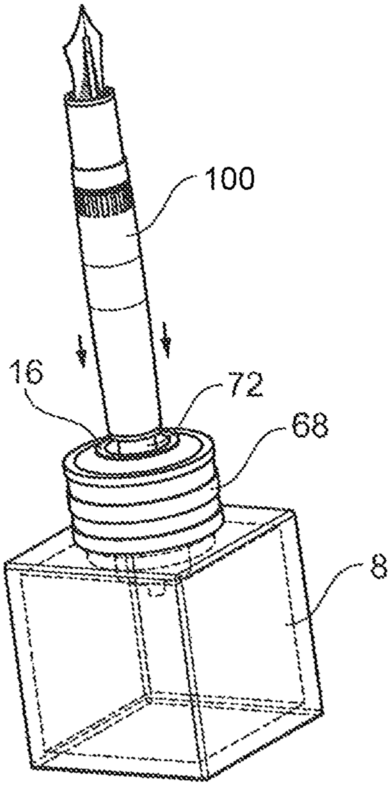
Figure 4:
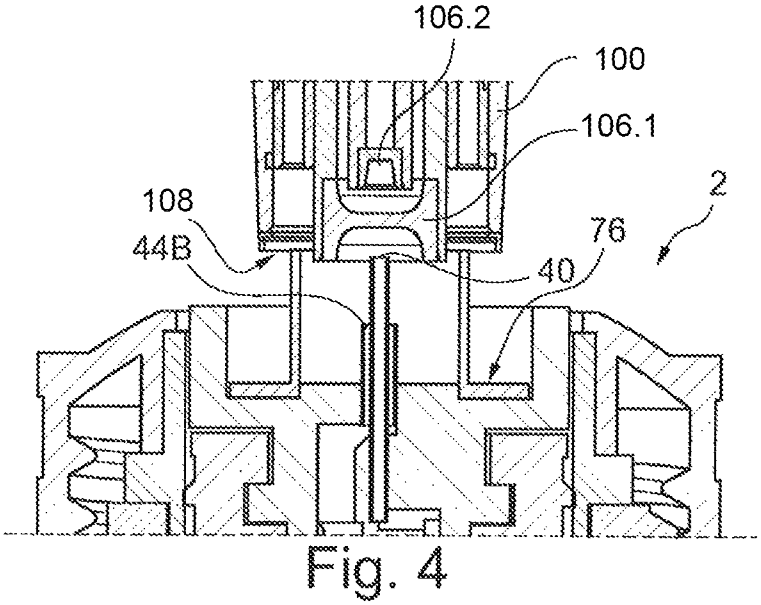
FIG. 4 and FIG. 5 show the process of placing a fountain pen on the filling system.
Figure 5:
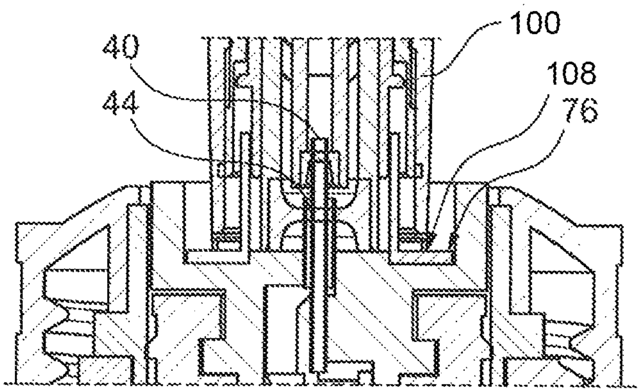

In FIG. 3*a* it can be seen how the process of connecting the fountain pen 100 to the filling system 2 takes place. This is shown in somewhat more detail in FIG. 4 and FIG. 5 below. The fountain pen 100 there has the two third sealing members 106.1, 106.2, which are not yet connected to the two connectors 40 and 44 in the position of FIG. 4. In FIG. 5, the fountain pen 100 is placed flush onto the filling system 2, so that a lower edge 108 of the fountain pen 100 abuts on a receiving surface 76 of the filling system. The piston 16 can then be pressed down to initiate the filling process.

Figure 3B:
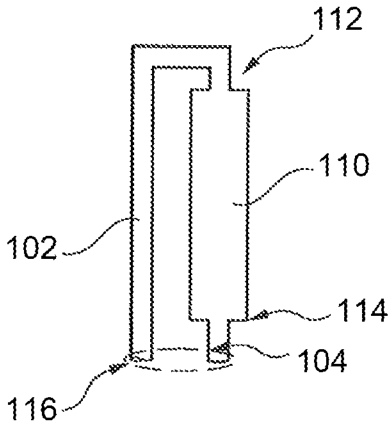
FIG. 3*b* schematically shows the equipment of a fountain pen for use of the filling system.

FIG. 3*b* shows an ink tank 110 in a very schematic manner with a first section 112 and a second section 114, which sections are arranged, in this example, at opposite ends of the ink tank 110. The first section 112 is connectable to an air line 102, the second section 114 is connectable to an ink line 104. The air line 102 and the ink line 104 can be brought together in a coupling arrangement 116, which are couplable to the first connection 40 and the second connection 44. In this way, the air line 102 and the first connection 40 are connected to one another and the ink line 104 is connected to the second connection 44. The illustration is understood to be schematic. The coupling arrangement 116 may also provide for a concentric arrangement of the two lines 102, 104.

Figure 6:
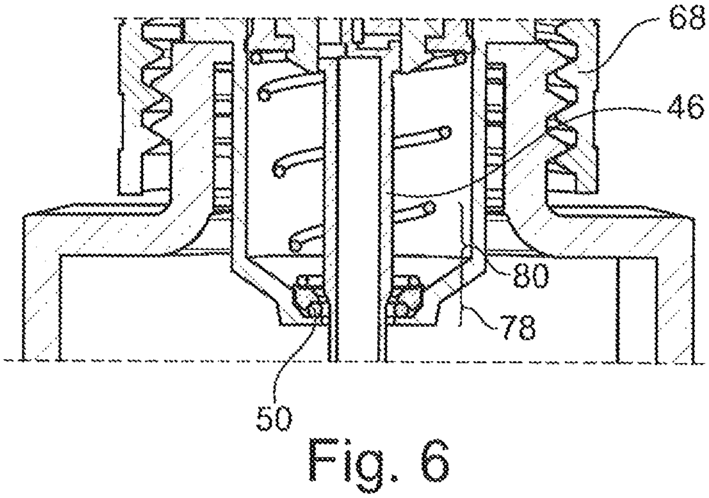
FIG. 6 shows a detailed section of an overflow in the filling system.

Lastly, FIG. 6 shows that the immersion end 46 has an overflow section 78. This is arranged in the direction of the piston 16 adjacent to the sealing section 80 and is located in the second sealing member 50, such that a gap is open in the neutral position of the piston 16. When the piston 16 is actuated, the sealing section 80 moves into the second sealing member 50 and thereby seals the air chamber 34. The overflow section 78 comprises, at least in part, a taper so that ink can pass into the ink container from the air chamber 34 through the lower section 12 via the overflow section 78. If, during filling of the fountain pen 100, an excessive amount of ink is suctioned from the ink container 8 into the ink line 104, this excess amount of ink can enter the air chamber 34 and run off again from there if the piston 16 has not yet returned to its neutral position.

In addition, it should be noted that the term "comprising" does not exclude other elements or steps, and "a" or "one" does not exclude a plurality. It should further be noted that features described with reference to any of the above embodiments may also be used in combination with other features of other embodiments described above. Reference numbers in the claims are not to be regarded as a limitation.

The invention claimed is:

1. A filling system for a fountain pen, comprising:

a pump unit attachable to an ink container having an ink volume;

an air channel connected to the pump unit and terminating at a first connection configured to connect to the fountain pen; and an ink channel separated from the air channel, the ink channel having immersion end for immersing into the ink volume and a second connection opposite the immersion end configured to connect to the fountain pen;

wherein the pump unit is operable to introduce a first air volume into the air channel with a positive pressure for flushing ink out of the fountain pen, and to evacuate a second air volume from the air channel with a negative pressure for drawing a predetermined volume of ink out of the ink channel and into the fountain pen.

2. The filling system according to claim 1, wherein the pump unit is a piston pump.

3. The filling system according to claim 2, wherein the pump unit comprises:

a cylinder with a lower section configured to be positioned in the ink container and an opening opposite the lower section;

a piston axially movable in the cylinder, wherein the piston is radially sealed from the cylinder such that the positive pressure acting on the first connection is created by moving the piston in a first direction toward the lower section and the negative pressure acting on the first connection is created by moving the piston toward the opening in a second direction opposite the first direction; and a spring element biasing the piston in the second direction;

wherein the air channel extends through the piston from an air chamber formed between the piston and the lower section, and the ink channel extends through the lower section and the piston.

4. The filling system according to claim 3, wherein the spring element comprises a compression spring arranged between the lower section and the piston.

5. The filling system according to claim 3, wherein the piston comprises a first sealing member arranged on a side facing the lower section.

6. The filling system according to claim 3, wherein the immersion end is guided in an axially sliding manner through a second sealing member arranged in the lower section.

7. The filling system according to claim 6, wherein the immersion end includes a sealing section that seats in the second sealing member when the piston is moved in the first direction beyond a neutral position, and an overflow section arranged adjacent to the sealing section and having a taper for passing ink from the air chamber through the lower section when the piston is in the neutral position.

8. The filling system according to claim 3, wherein the immersion end includes a first section arranged on a side of the lower section facing away from the air chamber and having a larger outer diameter than a second section arranged in the air chamber when the piston is in a neutral position.

9. The filling system according to claim 3, wherein the air channel and the ink channel are arranged in the piston in a radially offset configuration.

10. The filling system according to claim 3, wherein the cylinder comprises a shoulder on an outer side for flush placement of the cylinder on the ink container.

11. The filling system according to claim 1, wherein the first connection and the second connection are configured concentrically to one another.

12. The filling system according to claim 11, wherein the first connection is arranged within the second connection and extends beyond an end of the second connection.

13. The filling system according to claim 1, further comprising an insertion sleeve arranged on a side of the pump unit facing away from the air chamber, wherein the first connection and the second connection are supported in the insertion sleeve.

14. The filling system according to claim 13, further comprising a third sealing member arranged between the insertion sleeve and the piston.

15. A refillable writing instrument system, comprising:

a filling system having a pump unit attachable to an ink container having an ink volume, an air channel connected to the pump unit and terminating at a first connection configured to connect to the fountain pen, an ink channel separated from the air channel, the ink channel having immersion end for immersing into the ink volume and a second connection opposite the immersion end configured to connect to the fountain pen, wherein the pump unit is operable to introduce a first air volume into the air channel with a positive pressure for flushing ink out of the fountain pen, and to evacuate a second air volume from the air channel with a negative pressure for drawing a predetermined volume of ink out of the ink channel and into the fountain pen; and a fountain pen having an ink tank with a first section and a second section, a coupling arrangement in fluid communication with the first section and the second section, wherein the coupling arrangement is connectable to the first connection to establish a fluid connection between the first connection and the first section and is connectable to the second connection to establish a fluid connection between the second connection and the second section.

* * * * *